(12) United States Patent
Guim Bernat

(10) Patent No.: US 10,514,745 B2
(45) Date of Patent: Dec. 24, 2019

(54) TECHNIQUES TO PREDICT MEMORY BANDWIDTH DEMAND FOR A MEMORY DEVICE

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 15/721,423

(22) Filed: Sep. 29, 2017

(65) Prior Publication Data
US 2019/0101974 A1    Apr. 4, 2019

(51) Int. Cl.
| | |
|---|---|
| *G06F 1/32* | (2019.01) |
| *G06F 1/3206* | (2019.01) |
| *G06F 1/3225* | (2019.01) |
| *G06F 1/3221* | (2019.01) |
| *G06F 3/06* | (2006.01) |
| *G06F 1/3234* | (2019.01) |
| *G06F 1/3296* | (2019.01) |

(52) U.S. Cl.
CPC .......... *G06F 1/3206* (2013.01); *G06F 1/3221* (2013.01); *G06F 1/3225* (2013.01); *G06F 1/3275* (2013.01); *G06F 3/067* (2013.01); *G06F 1/3296* (2013.01)

(58) Field of Classification Search
CPC .... G06F 1/3206; G06F 1/3225; G06F 1/3296; G06F 1/3221
See application file for complete search history.

(56) References Cited

U.S. PATENT DOCUMENTS

| | | | |
|---|---|---|---|
| 6,898,674 B2 * | 5/2005 | Maiyuran | G06F 12/0215 711/137 |
| 9,152,490 B2 * | 10/2015 | Ahmadi-Ardakani | G06F 11/0757 |
| 10,001,827 B2 * | 6/2018 | Woo | G06F 1/3209 |
| 2018/0059977 A1 * | 3/2018 | Matsuyama | G06F 1/3268 |

* cited by examiner

*Primary Examiner* — Stefan Stoynov
(74) *Attorney, Agent, or Firm* — Compass IP Law PC

(57) ABSTRACT

Examples include techniques to predict memory bandwidth demand for a storage or memory device. Examples include receiving an access request to remotely access a storage device and gather information to use to predict a memory bandwidth demand for subsequent access requests to the storage device. Adjustments to power supplied to the storage device may be caused based on the predicted memory bandwidth demand. The adjustments may load balance power among a plurality of storage devices remotely accessible through a network fabric. The plurality of storage devices including the storage device.

25 Claims, 11 Drawing Sheets

Client Mapping Table 225

| Client ID | NVMe Target ID | Recent Metric History | | |
|---|---|---|---|---|
| | | BW Demand ID | BW Demand | Access Pattern |
| 108 | 109-1 | 300-1 | 10 GB/s | Random-R |
| 108 | 109-1 | 300-2 | 8 GB/s | SEQ-W |
| 108 | 109-1 | 300-N | 12 GB/s | Random-W |
| 110 | 109-n | 310-1 | 25 GB/s | SEQ-W |
| 110 | 109-n | 310-2 | 30 GB/s | SEQ-W |
| 110 | 109-n | 310-N | 20 GB/s | Random-R |
| 112 | 109-2 | 320-1 | 5 GB/s | Random-R |
| 112 | 109-2 | 320-2 | 7 GB/s | Random-R |
| 112 | 109-2 | 320-N | 8 GBs | Random-W |

*FIG. 3*

NVMe BW/Power Table 227

| NVMe Target ID | Memory BW | Power Usage | Time Period |
|---|---|---|---|
| 109-1 | 10 GB/s | 13W | 400-1 |
| 109-1 | 8 GB/s | 8W | 400-2 |
| 109-1 | 12 GB/s | 14W | 400-N |
| 109-2 | 25 GB/s | 22W | 410-1 |
| 109-2 | 30 GB/s | 25W | 410-2 |
| 109-2 | 20 GB/s | 15W | 410-N |
| 109-n | 5 GB/s | 4W | 420-1 |
| 109-n | 7 GB/s | 6W | 420-2 |
| 109-n | 8 GB/s | 8W | 420-N |

*FIG. 4*

Power Performance Table 229

| NVMe Target ID | Power Usage | Random Stream | | Sequential Stream | |
|---|---|---|---|---|---|
| | | Read BW | Write BW | Read BW | Write BW |
| 109-1 | 25W | 20GB/s | 15GB/s | 32GB/s | 24GB/s |
| 109-1 | 10W | 12GB/s | 8GB/s | 15GB/s | 10GB/s |
| 109-1 | 5W | 7GB/s | 5GB/s | 8GB/s | 6GB/s |
| 109-2 | 30W | 25GB/s | 20GB/s | 35GB/s | 28GB/s |
| 109-2 | 15W | 14GB/s | 12GB/s | 19GB/s | 15GB/s |
| 109-2 | 5W | 6GB/s | 5GB/s | 8GB/s | 6GB/s |
| 109-n | 25W | 20GB/s | 15GB/s | 32GB/s | 24GB/s |
| 109-n | 10W | 12GB/s | 8GB/s | 15GB/s | 10GB/s |
| 109-n | 5W | 7GB/s | 5GB/s | 8GB/s | 6GB/s |

*FIG. 5*

Format 600

| Client ID 610 | Expected Demand 620 | Peak Mem. BW Demand Requested 630 | Meta-Data 640 |

RECEIVE, AT A CONTROLLER, AN ACCESS REQUEST TO READ DATA TO OR WRITE DATA FROM AT LEAST ONE STORAGE DEVICE OF A PLURALITY OF STORAGE DEVICES COUPLED WITH A TARGET HOST COMPUTING NODE, THE ACCESS REQUEST INCLUDED IN A FABRIC PACKET ROUTED FROM A REQUESTING COMPUTING NODE THROUGH A NETWORKING FABRIC COUPLED WITH THE TARGET HOST COMPUTING NODE
902

PREDICT A MEMORY BANDWIDTH DEMAND FOR THE AT LEAST ONE STORAGE DEVICE FOR ONE OR MORE SUBSEQUENT ACCESS REQUESTS TO BE RECEIVED FROM THE REQUESTING COMPUTING NODE
904

CAUSE AN ADJUSTMENT TO POWER SUPPLIED TO THE AT LEAST ONE STORAGE DEVICE BASED, AT LEAST IN PART, ON THE PREDICTED MEMORY BANDWIDTH DEMAND FOR THE AT LEAST ONE STORAGE DEVICE
906

FIG. 9

Storage Medium *1000*

Computer Executable Instructions for 900

FIG. 10

TECHNIQUES TO PREDICT MEMORY BANDWIDTH DEMAND FOR A MEMORY DEVICE

TECHNICAL FIELD

Examples described herein are generally related to managing storage or memory devices remotely accessible to computing nodes coupled to the storage or memory devices via a networking fabric.

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of computing nodes connected via high-speed interconnects (e.g., fabric interconnects in a unified fabric).

A sharper focus on resource provisioning, resource management and meeting quality of service (QoS) requirements associated with service level agreements (SLAs) for large-scale computing environments may lead to a closer look at how certain resources are used. An area of focus may be use of disaggregated storage or memory devices that may be remotely accessed by computing nodes. These disaggregated storage or memory devices may include non-volatile and/or volatile types of memory that may be accessed through a memory controller. In some examples, the memory controller and the disaggregated storage or memory devices may be arranged to operate according to one or more standards or specifications such as, but not limited to, the Non-Volatile Memory Express (NVMe) Base Specification, revision 1.3, published in May 2017 ("NVM Express base specification" or "NVMe base specification"). For these examples, memory devices capable of being accessed using NVMe base specification protocols may be referred to as "NVMe devices".

NVMe devices may be remotely accessed by computing nodes interconnected via one or more types of unified fabric that may be referred to as "networking fabrics" that may use one or more communication protocols to exchange information or data. These networking fabrics may be capable of using a common architecture that supports use of NVMe base specification storage protocols to remotely access NVMe devices. Example communication protocols used by these networking fabrics may include, but are not limited to, Fibre Channel, InfiniBand, Remote Direct Memory Access (RDMA) over Converged Ethernet (RoCE), Internet Wide Area RDMA Protocol (iWARP) or transmission control protocol (TCP) communication protocols. The common architecture used by these types of networking fabrics may be based on one or more standards or specifications such as, but not limited to, the NVM Express over Fabrics (NVMeoF) Specification, revision 1.0, published in June 2016 ("NVMeoF specification"). Memory controllers hosted by computing nodes coupled with networking fabrics arranged to operate according to the NVMeoF specification to allow for remote access to NVMe devices may be referred to as "NVMeoF controllers".

BRIEF DESCRIPTION OF THE DRAWINGS

FIG. 3 illustrates an example client mapping table.
FIG. 4 illustrates an example bandwidth/power table.
FIG. 5 illustrates an example power performance table.
FIG. 6 illustrates an example format.
FIG. 9 illustrates an example of a logic flow.
FIG. 10 illustrates an example of a storage medium.

DETAILED DESCRIPTION

In some examples, an area of focus for large-scale computing environments may be how disaggregated storage or memory devices may be managed most effectively. These disaggregated storage or memory devices may include NVMe devices that may be remotely accessible through an NVMeoF controller hosted by a computing node coupled with multiple other computing nodes via a networking fabric using a common networking fabric architecture defined by the NVMeoF specification. In current implementations involving a common networking fabric architecture based, at least in part, on the NVMeoF specification, read/write requests from computing nodes may be generated to remotely access NVMe devices through an NVMeoF controller. The source or requester generating these read/write requests may be referred to as "client computing nodes" or "requesting computing nodes".

According to some example implementations involving a common networking fabric based, at least in part, on the NVMeoF specification, client computing nodes may have computing workloads that may cause remote access to NVMe devices. These computing workloads may cause the remote access to occur with different or varying performance requirements. The different performance requirements may imply that depending on how NVMe devices are mapped to client computing nodes, an amount of memory bandwidth that may be required for a remotely accessed NVMe device may be substantially lower than a peak memory bandwidth capability for the remotely accessed NVMe device. However, the remotely accessed NVMe device may be may be mapped to support only a particular workload or workloads of a client computing device due to capacity requirements for the particular workload or workloads.

Figure 1:
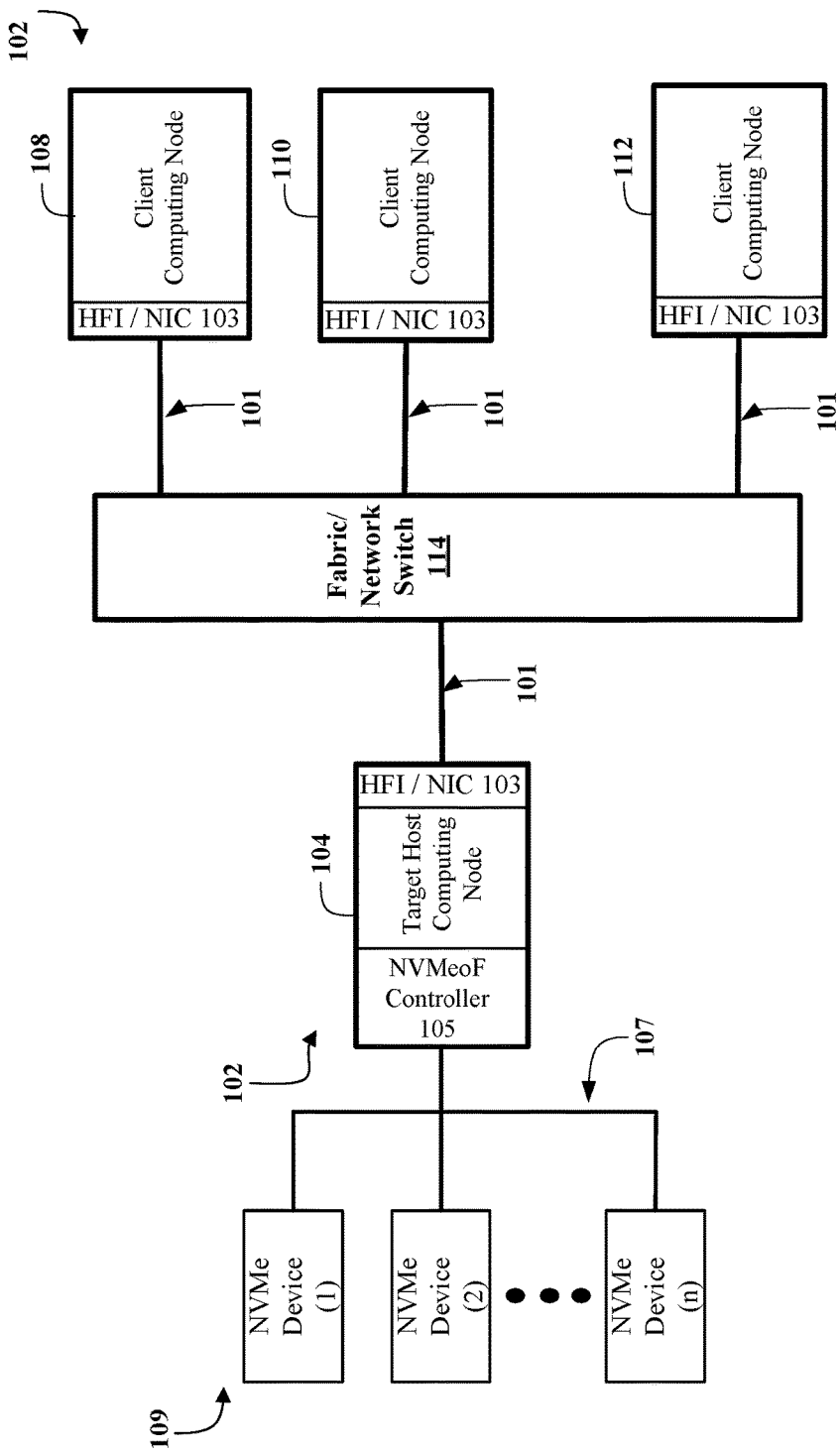
FIG. 1 illustrates an example system.

FIG. 1 illustrates an example system 100. In some examples, system 100 may represent at least a portion of a data center, a high performance computing (HPC) network, a telecommunications core network, an enterprise network or cloud-based distributed network. As shown in FIG. 1, computing nodes 102 may include a target host computing node 104 as well as multiple client computing nodes 108, 110 and 112. Computing nodes 102 may separately be communicatively coupled to a fabric/network switch 114 via individual fabric links 101. It should be appreciated that fabric/network switch 114 may be capable of receiving and forwarding network traffic (e.g., fabric packets, messages, datagrams, etc.) from computing nodes 102 coupled via fabric links 101. As described more below, each computing node 102 may include a host fabric interface (HFI)/network interface card (NIC) 103. HFI/NIC 103 may include communication circuitry and/or communication logic to enable computing nodes 102 to communicatively couple via fabric links 101 routed through fabric/network switch 114 and to facilitate receiving or transmitting of network traffic routed through fabric/network switch 114 and over fabric links 101.

In some examples, as shown in FIG. 1, target host computing node 104 may include an NVMeoF controller 105. As described more below, NVMeoF controller 105 may include logic and/or features capable of facilitating read/write access to selected NVMe devices from among NVMe devices 109. NVMe devices 109 are shown in FIG. 1 as NVMe device (1) through NVMe device (n) that may be coupled via links 107. For these examples, the "nth" NVMe device of NVMe devices 109 may represent a positive integer and designates one or more additional NVMe devices 109. Also, links 107 may be configured to operate according to the NVMe base specification to access NVMe devices 109.

According to some examples, NVMe devices 109 may serve as disaggregated storage resources that may be remotely accessible to client computing nodes 108, 110 or 112. For these examples, this remote access may be facilitated by NVMeoF controller 105 that is configured to operate according to the NVMeoF specification. Also, fabric links 101, fabric/network switch 114 and HFI/NIC 103 included in computing nodes 102 may be configured to operate using various types of communication protocols including, but not limited to, Fibre Channel, InfiniBand, RoCE, iWARP or TCP communication protocols as well as operating according to the NVMeoF specification to remotely access NVMe devices 109 via fabric links 101.

In some examples, NVMeoF controller 105 may receive access requests to read or write data to NVMe devices 109. These access requests may have originated from client computing nodes 108, 110 or 112 and may have been routed to target host computing node 104 via fabric links 101 through fabric/network switch 114. As described more below, logic and/or features of NVMeoF controller 105 may be capable of mapping individual client computing nodes to one or more NVMe devices from among NVMe devices 109, predicting memory bandwidth demands for respective client computing nodes over subsequent time periods and adjusting power to selected NVMe devices from among NVMe devices 109 based on the predicted memory bandwidth demands for or dictated by the respective client computing nodes.

According to some examples, NVMe devices 109 may include storage devices such solid state drives (SSDs) or other types of storage devices that may include non-volatile and/or volatile types of memory. Volatile types of memory may be memory whose state (and therefore the data stored on it) is indeterminate if power is interrupted. Non-volatile types of memory may refer to memory whose state is determinate even if power is interrupted. Dynamic volatile memory requires refreshing the data stored in this type of memory to maintain state. One example of dynamic volatile memory includes DRAM, or some variant such as synchronous DRAM (SDRAM). In addition to, or alternatively to, volatile types of memory included in NVMe device 109, non-volatile types of memory may be included in memory device(s) 109. According to some examples, non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including the metal oxide base, the oxygen vacancy base and the conductive bridge Random Access Memory (CB-RAM), a spintronic magnetic junction memory, a magnetic tunneling junction (MTJ) memory, a Domain Wall (DW) and Spin Orbit Transfer (SOT) memory, a thiristor based memory, a magnetoresistive random access memory (MRAM) that incorporates memristor technology, spin transfer torque MRAM (STT-MRAM), or a combination of any of the above.

In some examples, computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system.

It should be appreciated that, in other examples, there may be any number of computing nodes 102 (e.g., other target host computing nodes 104, other client computing nodes 108, 110, 112, etc.) coupled to fabric/network switch 114 or another fabric switch similar to fabric/network switch 114 in system 100. Accordingly, there may be multiple fabric switches in other examples. It should be further appreciated that, in such examples, multiple fabric switches may be connected, or daisy chained, to each other.

Figure 2:
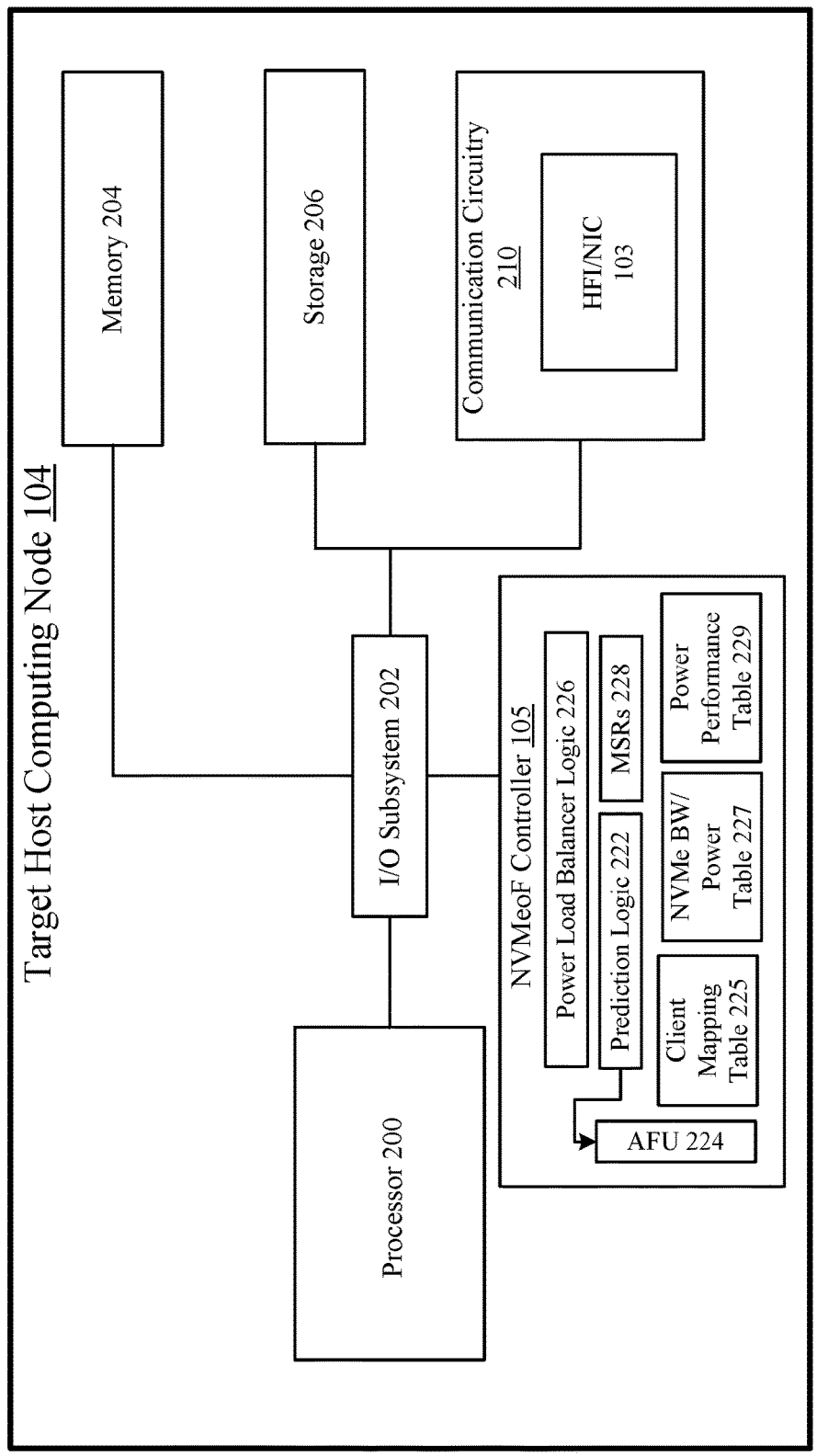
FIG. 2 illustrates an example target host computing node.

FIG. 2 illustrates an example block diagram of target host computing node 104. In some examples, as shown in FIG. 2, target host computing node 104 includes a processor 200, an input/output (I/O) subsystem 202, memory 204, storage 206, communication circuitry 210 and NVMeoF controller 105. Of course, it should be appreciated that one or more of the computing nodes 102 may include other or additional components, such as those commonly found in a computing device (e.g., peripheral devices, other processing/storage hardware, etc.), in other examples. Additionally, in some examples, one or more of the components shown in FIG. 2 may be incorporated in, or otherwise form a portion of, another component. For example, portions of memory 204 of target host computing node 104 may be incorporated in processor 200 (e.g., as cache memory) or incorporated in NVMeoF controller 105. Further, in some examples, one or more of the illustrative components may be omitted from the target host computing node 104 or added to target host computing node 104. For example, although target host computing node 104 is shown as including a single processor 200, the target host computing node 104 may include a greater number of processors in other examples.

According to some examples, processor 200 may be embodied as any type of multi-core processor capable of performing the functions described herein, such as, but not limited to, a single physical multi-processor core chip, or package. In some examples, processor core(s) of processor 200 may be separately embodied as an independent logical execution unit capable of executing programmed instructions. These processing core(s) may include a portion of cache memory (e.g., an L1 cache) and functional units usable to independently execute programs or threads. In some examples, processor 200 may be connected to a physical connector, or socket, on a motherboard (not shown) of the target host computing node 104 that is configured to accept a single physical processor package (i.e., a multi-core physical integrated circuit).

In some examples, memory 204 may be embodied as any type of volatile or non-volatile memory or data storage device capable of performing the functions described herein. In operation, memory 204 may store various data and software used during operation of the target host computing node 104, such as operating systems, applications, programs, libraries, and drivers. Memory 204 may be communicatively coupled to processor 200 or NVMeoF controller 105 via I/O subsystem 202, which may be embodied as circuitry and/or components to facilitate input/output operations with processor 200, NVMeoF controller 105, memory 204, or other components of target host computing node 104. For example, I/O subsystem 202 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some examples, I/O subsystem 202 may form a portion of a SoC and may be incorporated, along with one or all of processor 200, memory 204, NVMeoF controller 105 and/or other components of target host computing node 104, on a single integrated circuit chip.

According to some examples, storage 206 may be composed of any type of storage device or devices configured for short-term or long-term storage of data such as, for example, memory devices and circuits, memory cards, hard disk drives, solid-state drives, or other types of storage devices. It should be appreciated that storage 206 and/or the memory 204 (e.g., the computer-readable storage media) may store various data as described herein, including operating systems, applications, programs, libraries, drivers, instructions, etc., capable of being executed by a processor (e.g., processor 200) of target host computing node 104.

In some examples, communication circuitry 210 may include any communication circuit, device, or collection thereof, capable of enabling wireless and/or wired communications between target host computing node 104 and other computing devices (e.g., a client computing node 108, fabric/network switch 114, etc.). Communication circuitry 210 may be configured to use one or more communication technologies associated with networking fabrics including, but not limited to, Fibre Channel, InfiniBand, RoCE, iWARP or TCP communication protocols. Communication circuitry 210 may also capable of using other types of communication technologies in addition to those associated with networking fabric communication protocols to enable wireless and/or wired communications between target host computing node 104 and other computing devices (e.g., Internet Protocol (IP), Ethernet, Bluetooth®, Wi-Fi®, WiMAX, LTE, 5G, etc.).

According to some examples, as shown in FIG. 2, communication circuitry 210 may include HFI/NIC 103. HFI/NIC 103 may be composed of one or more add-in-boards, daughter cards, NICs, controller chips, chipsets, or other devices that may be used by target host computing node 104. For example, HFI/NIC 103 may be integrated with processor 200, embodied as an expansion card coupled to I/O subsystem 202 over an expansion bus (e.g., PCI Express (PCIe)), part of an SoC, or included on a multichip package that may contain one or more processors besides processor 200. In some examples, functionality of HFI/NIC 103 may be integrated into one or more components of target host computing node 104 at the board level, socket level, chip level, and/or other levels. HFI/NIC 103 may include logic and/or features to facilitate exchanges of data/messages between components (e.g., NVMeoF controller 105) of target host computing node 104 and client computing nodes received or transmitted over fabric links of a fabric network in order for the client computing nodes to remotely access one or more NVMe devices coupled with target host computing node 104. For example, facilitating the exchange of data/messages received in one or more fabric packets from client computing nodes 108, 110 or 112 routed via fabric links 101 through fabric/network switch 114 to target host computing node 104 coupled with NVMe devices 109 as shown in FIG. 1 for system 100. The one or more fabric packets may be arranged or exchanged according to communication protocols including, but not limited to, Fibre Channel, InfiniBand, RoCE, iWARP or TCP communication protocols and/or according to the NVMeoF specification and/or according to the NVMeoF specification.

In some examples, as shown in FIG. 2 and also shown in FIG. 1, target host computing node 104 also includes NVMeoF controller 105. As mentioned briefly above for FIG. 1, NVMeoF controller 105 may include logic and/or features capable of mapping individual client computing nodes to one or more NVMe devices from among NVMe devices 109, predicting memory bandwidth demands for respective client computing nodes over subsequent time periods and adjusting power to selected NVMe devices from among NVMe devices 109 based, at least in part, on the predicted memory bandwidth demands for the respective client computing nodes. According to some examples, as shown in FIG. 2, these logic and/or features of NVMeoF controller may include, but are not limited to, a power load balancer logic 226, a prediction logic 222, mode storage registers (MSRs) 226, an acceleration functions unit (AFU) 224, a client mapping table 225, an NVMe BW/Power table 227 or a power performance table 229.

According to some examples, NVMeoF controller 105 may receive access requests included in fabric packets or fabric messages received and/or processed by HFI/NIC 103 to read data from or write data to NVMe devices 109. For these examples, the access requests may have originated from client computing nodes 108, 110 or 112 and were routed to target host computing node 104 via fabric links 101 through fabric/network switch 114. At least some of the access requests may be associated with random access patterns hereinafter referred to as "random streams". These random streams may read/write data from/to random NVMe device memory addresses at one or more NVMe devices of NVMe devices 109. At least some of the individual access requests may be associated with sequential access patterns hereinafter referred to as "sequential streams". These sequential streams may read/write data from/to sequential NVMe device memory addresses at one or more NVMe devices of NVMe devices 109.

In some examples, prediction logic 222 may be capable of predicting memory bandwidth demands for respective client computing nodes accessing NVMe devices coupled with target host computing node 104 over subsequent time periods. In some examples, prediction logic 222 may utilize AFU 224 to implement prediction algorithms to predict memory bandwidth demands. AFU 224 may be a field programmable gate array (FPGA) designed or programmed to implement prediction algorithms. Inputs to these prediction algorithms may be based on one or more of telemetry gathered from NVMe devices 109 during accesses by client computing nodes 108, 110 or 112, memory bandwidth demand hints provided by these client computing nodes or historic information gathered that indicates what memory bandwidth client computing nodes 108, 110 or 112 have requested when accessing individual NVMe device from among NVMe devices 109.

According to some examples, prediction algorithms implemented by AFU 224 may include inputs obtained from client mapping table 225 and NVMe BW power table 227. As described more below, client mapping table 225 may include information related to client computing nodes 108, 110 or 112 and how these client computing nodes have historically demanded memory bandwidth during access to NVMe devices 109 over a given period of time. Also as described more below, NVMe BW power table 229 may include historical memory bandwidth and power usage for individual NVMe devices of NVMe devices 109.

In some examples, power performance table 229 may include information that is acquired or obtained during configuration of or start/boot up of NVMe devices 109. As described more below, power performance table 229 may be a static data structure filled by information exposed by NVMe devices 109 at time of booting or starting up (e.g., using a scheme such as a PCIe base address registers (BARs)). The information included in power performance table 229 may include power usage by respective NVMe devices 109 and corresponding read/write memory bandwidths for different types of access patterns. For example, read/write memory bandwidths for random streams or read/write memory bandwidths for sequential streams.

According to some examples, power load balance logic 226 may use information provided by prediction logic 222 and included in power performance table 229 to cause a reduction in power to one or more first NVMe devices of NVMe devices 109. The reduction in power may be based on a prediction that the one or more first NVMe devices do not need to run at full power to meet predicted memory bandwidth needs and/or meet latency requirements for accesses to the one or more first NVMe devices by clients mapped to the one or more first NVMe devices (e.g., mapped as indicated in client mapping table 225). Power load balancer logic 226 may also use the information provided by prediction logic 222 and included in power performance table 229 to cause an increase in power to one or more second NVMe devices of NVMe devices 109. The increase in power may be based on a prediction that the one or more second NVMe devices will need more power to enable the one or more second NVMe devices to meet predicted memory bandwidth for accesses to the one or more second NVMe devices by clients mapped to the one or more second NVMe devices.

In some examples, MSRs 228 may include information to configure how often power load balancer logic 226 may adjust or change power to NVMe devices 109. MSRs 228 may also include information to indicate to power load balancer logic 226 what power sources may be adjusted to change power provided to NVMe devices 109. MSRs 228 may also be used to provide or update prediction algorithms to be implemented by AFU 224. According to some example where AFU 224 is an FPGA, MSRs 228 may be used to update or reprogram the FPGA to handle new or modified prediction algorithms.

FIG. 3 illustrates an example client mapping table 225. In some examples, as shown in FIG. 3, client mapping table 225 includes information to indicate clients, NVMe devices mapped to those clients and information to indicate recent metrics related to accesses to respectively mapped NVMe devices. In some examples, client mapping table 225 may be maintained in a data structure (e.g., a lookup table) stored in a memory maintained at NVMeoF controller 105 and accessible to prediction logic 222.

In some examples, a client identifier (ID) and NVMe target ID(s) for each entry in client mapping table 225 may indicate a mapping of client computing nodes to respective one or more NVMe device(s). For examples, as shown in FIG. 3, client IDs 108, 110 and 112 may be mapped to NVMe target ID(s) 109-1, 109-n and 109-2, respectively. For simplicity purposes, client computing nodes 108, 110 and 112 and NVMe target IDs are given numbers related to those shown in FIG. 1. Examples are not limited to 3-digit client IDs or to 4-digit NVMe target IDs.

According to some examples, each entry of client mapping table 225 may also include recent metric history information. The recent metric history information may include, but is not limited to, memory bandwidth demand. For these examples, recent metric history information may include a known number "N" of memory bandwidth (BW) demands for each client. For example, client ID 108 may have had memory BW demands of 10 gigabytes/second (GB/s), 8 GB/s and 12 GB/s for memory BW demands 300-1, 300-2 and 300-N, respectively. Client ID 110 may have had memory BW demands of 25 GB/s, 30 GB/s and 20 GB/s for memory BW demands 310-1, 310-2 and 310-N, respectively. Client ID 112 may have had memory BW demands of 5 GB/s, 7 GB/s and 8 GB/s for memory BW demands 320-1, 320-1 and 320-N, respectively. In some examples, memory BW demand history for the clients in client mapping table 225 may be based on meeting SLA or QoS requirements or may be based on workload access patterns associated with a given client computing node.

FIG. 4 illustrates an example NVMe BW/Power table 227. In some examples, as shown in FIG. 4, NVMe BW/Power table 227 includes entries for NVMe target IDs 109-1, 109-2 and 109-N. For these examples, NVMe BW/Power table may provide a history of memory BW demand and associated power usage in watts (W) for each NVMe target ID entry over "N" time periods. For example, NVMe target IDs 109-1, 109-2 and 109-N are shown in FIG. 4 as having memory BW demands and power usage over respective time periods 400-1 to 400-N, 410-1 to 410-N and 420-1 to 420-N. The example memory BW demands and associated power usages shown in FIG. 4 for NVMe BW/Power table provide examples of how increases/decreases in memory BW demand may use higher/lower amounts of power. Examples are not limited to the ratio of memory BW demands to power usage shown in FIG. 4. Examples shown in FIG. 4 are merely illustrative of how power usage may vary with changes in memory BW demand.

FIG. 5 illustrates an example power performance table 229. In some examples, as mentioned briefly above, power performance table 229 may include information that is acquired or obtained during configuration of or start/boot up of NVMe devices 109. For these examples, as shown in FIG. 5, power performance table 227 includes example power usage levels and expected read/write memory BW capabilities for each power usage level and for random or sequential streams.

In some examples, NVMe target ID 109-2 may have a peak power usage of 30 W. Also. As shown in FIG. 5, memory BW capabilities for read/writes having a random stream may be relatively lower compared to read/writes having a sequential stream. Also, read BW capabilities may be relatively higher than write BW capabilities for both random or sequential streams. Thus, for these examples, a read BW of 25 GB/s and a write BW of 20 GB/s are shown in FIG. 5 for the 30 W peak power usage when access patterns to NVMe target ID 109-2 are via random streams. Read BW of 35 GB/s and write BW of 28 GB/s are shown for when access patterns are via sequential streams.

FIG. 6 illustrates an example format 600. In some examples, example format 600 may represent example fields included in a fabric message or packet having a memory BW demand hint from a client computing node to indicate and/or request a peak memory BW for accesses to NVMe devices coupled with a target host computing node. As shown in FIG. 6, example format 600 includes client ID 610, expected demand 620, peak memory BW demand requested 630 and meta-data 640. For these examples, client ID 610 may indicate the identifier for the client computing node (e.g., 108). Expected demand 620 may indicate what an expected memory BW demand may be for the client computing node during a period or unit of time relative to a given point of time (e.g., for the next 100 ms relative to time of receipt of the hint). Information included in expected demand 620 may also indicate the type(s) of access patterns expected to use memory BW during the period or unit of time (e.g., Random-R, Random-W, SEQ-R or SEQ-W). Peak memory BW demand requested 630 may indicate whether the client computing node may need or is expected to need the maximum amount of available memory BW during the period or unit of time. Meta-data 640 may include additional information about expected memory BW demand (e.g., priority information).

Figure 7:
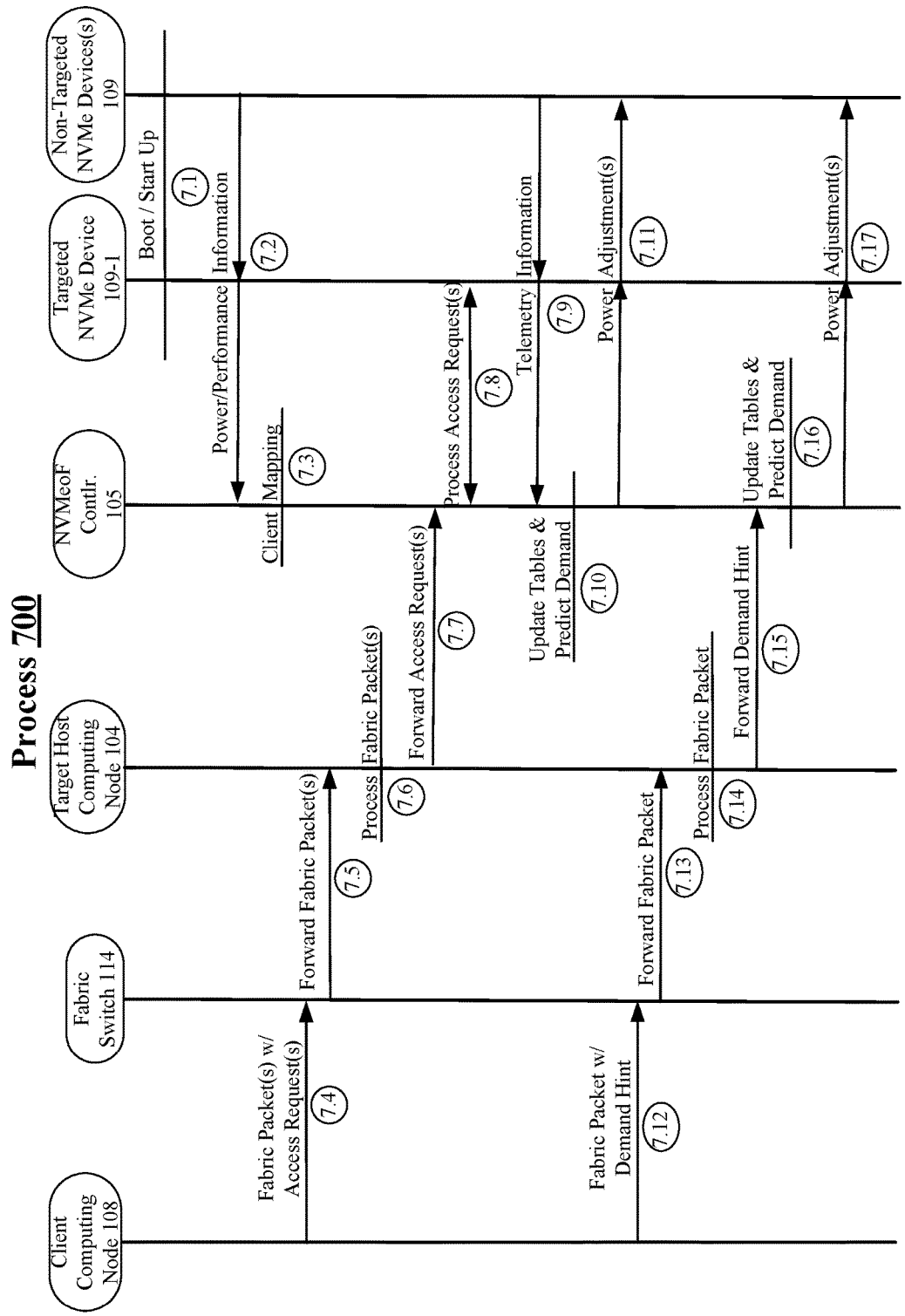
FIG. 7 illustrates an example process.

FIG. 7 illustrates an example process 700. According to some examples, process 700 may be an example of how logic and/or features of NVMeoF controller 105 may map individual client computing nodes to one or more NVMe devices from among NVMe devices 109, predict memory bandwidth demands for a client computing node over one or more subsequent time periods and adjust power to one or more selected or targeted NVMe devices based, at least in part, on the predicted memory bandwidth demands for the client computing node. For these examples, elements of system 100 as shown in FIG. 1 or elements of target host computing node 104 as shown in FIG. 2 may implement at least portions of process 700. Also, client mapping table 225 (shown in FIG. 3), NVMe BW/power table 227 (shown in FIG. 4), power performance table 229 (shown in FIG. 5) or example format 600 (shown in FIG. 6) may be used to implement at least portions of process 700. Examples are not limited to elements of system 100 or elements of target host computing node 104 implementing process 700 or to use of client mapping table 225, NVMe BW/power table 227, power performance table 229 or example format 600 when implementing process 700.

Beginning at process 7.1 (Boot/Start Up), NVMe devices 109 may be booted or started up.

Moving to process 7.2 (Power/Performance Information), logic and/or features at NVMeoF controller 105 may obtain power/performance information from NVMe devices 109. According to some examples, the power/performance information may be obtained by logic and/or features of NVMeoF controller 105 using a scheme similar to PCIe BARs. The power/performance information may be added to power performance table 229 and may include the power performance information shown in FIG. 5 for NVMe devices 109-1 to 109-N.

Moving to process 7.3 (Client Mapping), logic and/or features at NVMeoF controller 105 may map client computing nodes 108, 110 and 112 to NVMe devices 109. In some examples, client mapping table 225 may be initiated or built to include entries for each client computing node mapped to NVMe device 109. When initially built, client mapping table 225 does not include recent metric history information. The recent metric history information may be continually updated to include metric history information as computing nodes access mapped NVMe device(s) 109.

Moving to process 7.4 (Fabric Packet(s) w/ Access Request(s)), requesting/client computing node 108 may generate and send one or more fabric packets that may include an access request to read/write data from/to targeted NVMe device 109-1 coupled with target host computing node 104. In some examples, as shown in FIG. 7, the fabric packets may be routed through fabric/network switch 114. The fabric packets may be arranged according to communication protocols associated with networking fabrics including, but not limited to, Fibre Channel, InfiniBand, RoCE, iWARP or TCP communication protocols and/or according to the NVMeoF specification.

Moving to process 7.5 (Forward Fabric Packet), fabric/network switch 114 may forward the fabric packet to target host computing node 104.

Moving to process 7.6 (Process Fabric Packet), logic and/or features at target host computing node 104 such as HFI/NIC 103 may process the fabric packet in order to de-encapsulate the access request from the fabric packet and identify that the access is to be forwarded to NVMeoF controller 105 that controls access to the one or more NVMe devices coupled with target host computing node 104.

Moving to process 7.7 (Forward Access Request), logic and/or features at target host computing node 104 may forward the identified access request to NVMeoF controller 105.

Moving to process 7.8 (Process Access Request(s)), logic and/or features at NVMeoF controller 105 may process the one or more access requests received from client computing node 108. In some example, the logic and/or features at NVMeoF may route the one or more processed access requests to targeted NVMe device 109-1 according to client mapping table 225.

Moving to process 7.9 (Telemetry Information), logic and/or features of NVMeoF controller 105 may gather telemetry information from targeted NVMe device 109-1 and non-targeted NVMe device(s) 109. In some examples, the telemetry information may include, but is not limited to, observed memory BW demands, power usage for targeted NVMe device 109-1 and non-targeted NVMe device(s) 109 as well as access patterns to these NVMe devices.

Moving to process 7.10 (Update Tables & Predict Demand), logic and/or features at NVMeoF controller 105 may update client mapping table 225 and NVMe BW/power table 227 based on the gathered telemetry information. According to some examples, recent metric history information in client mapping table 225 for client computing node 108 may be updated based on telemetry information gathered while processing the one or more access requests received from client computing node 108. Memory BW demand and power usage information included in NVMe BW/power table 227 for NVMe device 109-1 may also be updated based on the gathered telemetry information. For these examples, prediction logic 222 may use the updated information added to client mapping table 225 and NVMe BW/power table 227 to predict memory BW demand for NVMe devices 109. Prediction logic 222 may utilize AFU 224 to implement prediction algorithms to predict memory BW demand.

Moving to process 7.11 (Power Adjustment(s)), logic and/or features at NVMeoF controller 105 may cause power adjustments to targeted NVMe device 109-1 and/or one or more non-targeted NVMe device(s) 109. In some examples, power load balancer logic 226 may receive predicted memory BW demand information from prediction logic 222. Power load balancer logic 226 may then compare the predicted memory BW demand with entries in power performance table 229 corresponding to respective NVMe devices 109 to determine what power usage may be expected for the predicted memory BW demand. For example, if the predicted memory BW demand was around 15 GB/s for reading data from NVMe device 109-1 via a sequential stream, the expected power usage would be 10 W according to power performance table 229. Expected power usages may also be determined for non-targeted NVMe device(s) 109. Power load balancer logic 226 may then cause power adjustments to targeted NVMe device 109-1 or non-targeted NVMe device(s) 109 based on expected power usages for these NVMe devices. For example, if targeted NVMe device 109 was using 25 W of power, power load balancer logic 226 may cause an adjustment to reduce power usage to the expected power usage of 10 W.

Moving to process 7.12, (Fabric Packet w/ Demand Hint), requesting/client computing node 110 may generate and send a fabric packet having a memory BW demand hint from client computing node 108 to indicate and/or request a peak memory BW for accesses to targeted NVMe device 109-1. In some examples, the memory BW demand hint may be based on information included in example format 600 as described above and shown in FIG. 6.

Moving to process 7.13, (Forward Fabric Packet), fabric/network switch 114 may forward the fabric packet to target host computing node 104.

Moving to process 7.14 (Process Fabric Packet), logic and/or features at target host computing node 104 such as HFI/NIC 103 may process the fabric packet in order to de-encapsulate the memory BW hint information from the fabric packet and identify that the memory BW hint information is to be forwarded to NVMeoF controller 105.

Moving to process 7.15 (Forward Demand Hint), logic and/or features at target host computing node 104 may forward the memory BW hint information to NVMeoF controller 105.

Moving to process 7.16 (Update Tables & Predict Demand) logic and/or features at NVMeoF controller 105 may update client mapping table 225 based on the information included in the memory BW hint information received from client computing node 108. According to some examples, prediction logic 222 may use the updated information added to client mapping table 225 as well as information included in NVMe BW/power table 227 to predict memory BW demand for NVMe devices 109 over one or more subsequent units of time.

Moving to process 7.17 (Power Adjustment(s)), logic and/or features at NVMeoF controller 105 may cause power adjustments to targeted NVMe device 109-1 and/or one or more non-targeted NVMe device(s) 109. In some examples, power load balancer logic 226 may receive updated predicted memory BW demand information from prediction logic 222. Power load balancer logic 226 may then compare the updated predicted memory BW demand with entries in power performance table 229 corresponding to respective NVMe devices 109 to determine what power usage may be expected for the predicted memory BW demand. Power load balancer logic 226 may then cause power adjustments to targeted NVMe device 109-1 or one or more non-targeted NVMe device(s) 109 based on expected power usages for these NVMe devices. Process 700 may then come to an end.

Figure 8:
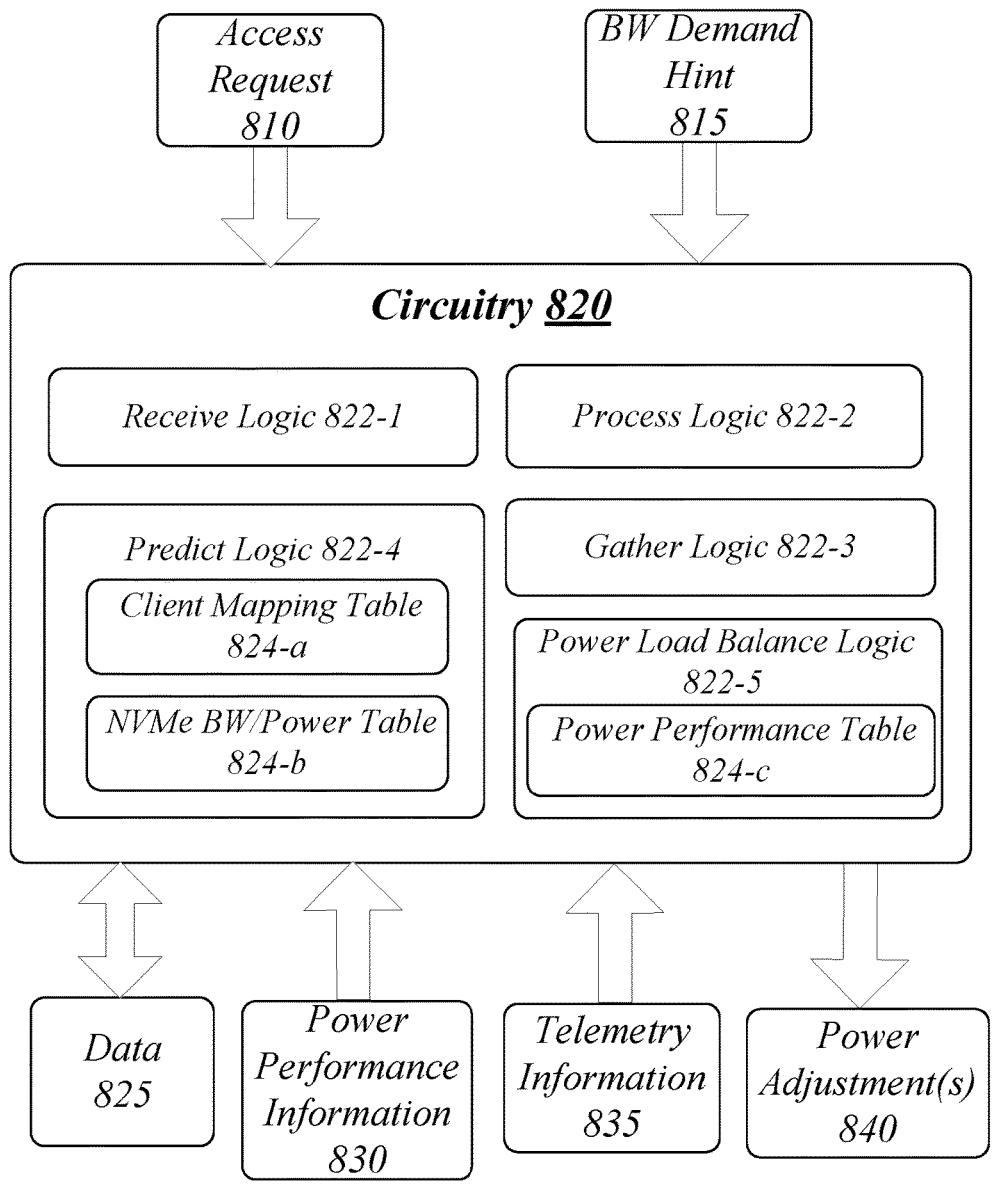
FIG. 8 illustrates an example block diagram for an apparatus.

FIG. 8 illustrates an example block diagram for an apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be associated with a controller hosted by a target host computing node coupled with a networking fabric. For example, NVMeoF controller 105 as shown in FIGS. 1-2. Apparatus 800 may be supported by circuitry 820. For these examples, circuitry 820 may be incorporated within a processor, central processing unit (CPU), application specific integrated circuit (ASIC) or may include one or more field programmable gate arrays (FPGAs) maintained at a controller. Circuitry 820 may be arranged to execute one or more software, firmware or hardware implemented modules, components or logic 822-$a$ (module, component or logic may be used interchangeably in this context). It is worthy to note that "a" and "b" and "c" and similar designators as used herein are intended to be variables representing any positive integer. Thus, for example, if an implementation sets a value for a=5, then a complete set of any combination of software, firmware or hardware for logic 822-$a$ may include logic 822-1, 822-2, 822-3, 822-4 or 822-5. The examples presented are not limited in this context and the different variables used throughout may represent the same or different integer values. Also, "logic", "module" or "component" may also include software/firmware stored in computer-readable media, and although the types of logic are shown in FIG. 8 as discrete boxes, this does not limit these components to storage in distinct computer-readable media components (e.g., a separate memory, etc.).

According to some examples, circuitry 820 may include a processor, processor circuit or processor circuitry. Circuitry 820 may be generally arranged to execute or implement one or more modules, components or logic 822-$a$. Circuitry 820 may be all or at least a portion of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScaleread® processors; and similar processors. According to some examples circuitry 820 may also include an ASIC and at least some logic 822-$a$ may be implemented as hardware elements of the ASIC. According to some examples, circuitry 820 may also include an FPGA and at least some logic 822-$a$ may be implemented as hardware elements of the FPGA.

According to some examples, apparatus 800 may include receive logic 822-1. Receive logic 822-1 may be executed or implemented by circuitry 820 to receive an access request to read data from or write data to at least one storage device of a plurality of storage devices coupled with a target host computing node, the access request included in a fabric packet routed from a requesting computing node through a networking fabric coupled with the target host computing node. For these examples, the access request may be included in access request 810. Access request 805 may be pulled/extracted from the fabric packet by a communication interface (e.g., a host fabric interface) for the target host computing node and forwarded for receipt by receive logic 822-1.

In some examples, apparatus 800 may include process logic 822-2. Process logic 822-2 may be executed or implemented by circuitry 820 to process the access request to cause data to be read from or written to the at least one storage device. For these examples, the data read from or written to the at least one storage devices may be included in data 825.

According to some examples, apparatus 800 may include gather logic 822-3. Gather logic 822-3 may be executed or implemented by circuitry 820 to gather telemetry information from the plurality of storage devices while data is read from or written to the at least one storage device. For these examples, the gathered telemetry information may be included in telemetry information 835. Also, in some examples, gather logic 822-3 may gather power performance information from the at least one storage device and the plurality of storage devices when these storage devices are started up or booted. The gathered power performance information gathered may be included in power performance information 830.

In some examples, apparatus 800 may include predict logic 822-4. Predict logic 822-4 may be executed or implemented by circuitry 820 to predict a memory bandwidth demand for the at least one storage device for one or more subsequent access requests to be received from the requesting computing node. For these examples, a prediction algorithm may be used to predict the memory bandwidth demand. Inputs to the prediction algorithm may include past memory bandwidth demands for one or more previous access requests that caused data to be written to or read from the at least one storage device and past power usage of the at least one storage device while data was written to or read from the at least one storage device responsive to the previous access requests. Client mapping table 824-a may include information regarding the past memory bandwidth demands. NVMe BW/Power table 824-b may include information regarding the past power usage of the at least one storage device. Both client mapping table 824-a and NVMe BW/Power table 824-b may be maintained by and/or accessible to process logic 822-4 in data structures such as look up tables.

According some examples, apparatus 800 may include power load balance logic 822-5. Power load balance logic 822-5 may be executed or implemented by circuitry 820 to cause an adjustment to power supplied to the at least one storage device based, at least in part, on the predicted memory bandwidth demand for the at least one storage device. For these examples, power load balance logic 822-5 may use power performance information included in power performance table 824-c to determine an expected power usage for the at least one storage device. As mentioned above, gather logic 822-3 may have gathered the power performance information when the at least one storage device was started up. Power performance table 824-c may be maintained by and/or accessible to power load balance logic 822-5 (e.g., in a look up table). The power adjustment may be included in power adjustment(s) 840.

Various components of apparatus 800 and computing node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example of a logic flow 900. Logic flow 900 may be representative of some or all of the operations executed by one or more logic, features, or devices described herein, such as apparatus 800. More particularly, logic flow 900 may be implemented by at least receive logic 822-1, predict logic 822-4 or power load balance logic 822-5.

According to some examples, logic flow 900 at block 902 may receive, at a controller, an access request to read data from or write data to at least one storage device of a plurality of storage devices coupled with a target host computing node, the access request included in a fabric packet routed from a requesting computing node through a networking fabric coupled with the target host computing node. For these examples, receive logic 922-1 may receive the access request.

In some examples, logic flow 900 at block 904 may predict a memory bandwidth demand for the at least one storage device for one or more subsequent access requests to be received from the requesting computing node. For these examples, predict logic 922-4 may predict the memory bandwidth demand.

According to some examples, logic flow 900 at block 906 may cause an adjustment to power supplied to the at least one storage device based, at least in part, on the predicted memory bandwidth demand for the at least one storage device. For these examples, power load balance logic 822-5 may cause the adjustment to power.

FIG. 10 illustrates an example of a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
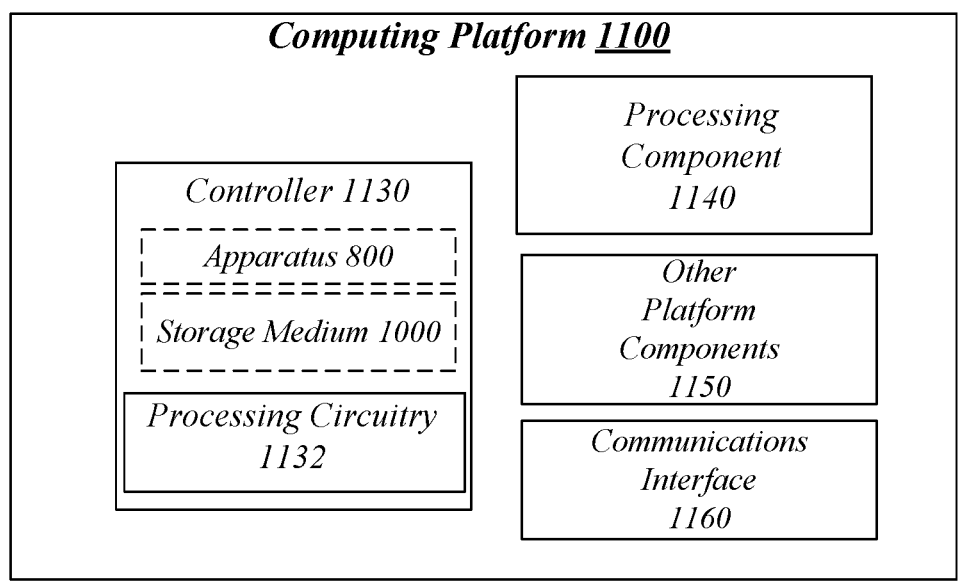
FIG. 11 illustrates an example computing platform.

FIG. 11 illustrates an example computing platform 1100. In some examples, as shown in FIG. 11, computing platform 1100 may include a controller 1130, a processing component 1140, other platform components 1150 or a communications interface 1160. According to some examples, computing platform 1100 may be implemented in a target host computing node coupled to a networking fabric such as target host computing node 104 shown in FIG. 1.

According to some examples, controller 1130 may be similar to NVMeoF controller 105 of system 100 as shown in FIGS. 1-2. For these examples, logic and/or features resident at or located at controller 1130 may execute at least some processing operations or logic for apparatus 800 and may include storage media that includes storage medium 1000. Controller 1130 may include processing circuitry 1132. Processing circuitry may include various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

According to some examples, processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, PLD, DSP, FPGA/programmable logic, memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include memory units, chipsets, controllers, peripherals, interfaces, oscillators, timing devices, video cards, audio cards, multimedia I/O components (e.g., digital displays), power supplies, and so forth. Examples of memory units associated with either other platform components 1150 or controller 1130 may include without limitation, various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, ferroelectric memory, SONOS memory, polymer memory such as ferroelectric polymer memory, FeTRAM or FeRAM, ovonic memory, single or multi-level PCM, nanowire, memristers, STT-MRAM, magnetic or optical cards, an array of devices such as Redundant Array of Independent Disks (RAID) drives, solid state memory devices, solid state drives (SSDs), hard disk drives (HDDs) or any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe base specification, the SATA specification, SAS specification or the USB specification. Network communications may occur through a network interface via use of communication protocols or standards such as those described in one or more Ethernet standards promulgated by the IEEE. For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communication may also occur over fabric links coupled with computing platform 1100 according to the NVMeoF specification, or using one or more of or using one or more of Fibre Channel communication protocols, InfiniBand communication protocols, RoCE communication protocols, iWARP communication protocols or TCP communication protocols.

As mentioned above computing platform 1100 may be implemented in a target host computing node coupled to a networking fabric. Accordingly, functions and/or specific configurations of computing platform 1100 described herein, may be included or omitted in various embodiments of computing platform 1100, as suitably desired for a computing node coupled to a networking fabric.

The components and features of computing platform 1100 may be implemented using any combination of discrete circuitry, ASICs, logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A controller comprising:
   circuitry; and
   logic for execution by the circuitry to:
   receive an access request to read data from or write data to at least one storage device of a plurality of storage devices coupled with a target host computing node that hosts the controller, the access request included in a fabric packet routed from a requesting computing node through a networking fabric coupled with the target host computing node;
   predict a memory bandwidth demand for the at least one storage device for one or more subsequent access requests to be received from the requesting computing node; and
   cause an adjustment to power supplied to the at least one storage device based, at least in part, on the predicted memory bandwidth demand for the at least one storage device.

2. The controller of claim 1, the logic to cause the adjustment to power supplied to the at least one storage device based, at least in part, on the predicted memory bandwidth demand further comprises the logic to:
   cause the adjustment to the power based on expected power usage determined according to power performance information for the at least one storage device that indicates expected power usage for separate memory bandwidth demands from among a plurality of memory bandwidth demands.

3. The controller of claim 2, further comprising the logic to:

obtain the power performance information for the at least one storage device following a start up of the at least one storage device.

4. The controller of claim 1, the logic to predict the memory bandwidth demand comprises the logic to use a prediction algorithm, the logic to include past memory bandwidth demands for one or more previous access requests that caused data to be written to or read from the at least one storage device as a first input to the prediction algorithm and include past power usage of the at least one storage device while data was written to or read from the at least one storage device responsive to the previous access requests as a second input to the prediction algorithm.

5. The controller of claim 4, comprising the prediction algorithm implemented by a field programmable gate array (FPGA) coupled with the controller.

6. The controller of claim 1, comprising the logic to:
receive a memory bandwidth demand hint from the requesting computing node, the memory bandwidth demand hint included in a second fabric packet from the requesting computing node routed through the networking fabric coupled with the target host computing node, the memory bandwidth demand hint to indicate an expected memory bandwidth demand during a unit of time relative to a given point of time;
predict a second memory bandwidth demand for the at least one storage device for the one or more subsequent access requests to be received from the requesting computing node; and
cause a second adjustment to power supplied to the at least one storage device based, at least in part, on the predicted second memory bandwidth demand.

7. The controller of claim 6, the logic to cause the adjustment to power supplied to the at least one storage device based, at least in part, on the predicted memory bandwidth demand for the at least one storage device further comprises the logic to:
cause an adjustment to power supplied to one or more storage devices other than the at least one storage device to load balance power usage between the plurality of storage devices.

8. The controller of claim 1, comprising the logic to:
process the access request to cause data to be read from or written to the at least one storage device;
gather telemetry information from the plurality of storage devices while data is read from or written to the at least one storage device; and
use at least a portion of the gathered telemetry information to predict the memory bandwidth demand for the at least one storage device for one or more subsequent access requests to be received from the requesting computing node.

9. The controller of claim 1, comprising the plurality of storage devices arranged to operate according to one or more Non-Volatile Memory Express (NVMe) Base Specifications including the NVMe Base Specification, revision 1.3.

10. The controller of claim 9, comprising:
the controller arranged to operate according to the one or more NVMe Base Specifications including the NVMe Base Specification, revision 1.3 and according to one or more NVM Express over Fabrics (NVMeoF) Specifications including the NVMeoF Specification, revision 1.0;
the access request included in the fabric packet is arranged according to the one or more NVMeoF Specifications including the NVMeoF Specification, revision 1.0; and
the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

11. The controller of claim 1, comprising one or more of:
a command bus coupled to the circuitry;
one or more processors coupled to the command bus; and
a host fabric interface communicatively coupled to the circuitry.

12. A method comprising:
receiving, at a controller, an access request to read data from or write data to at least one storage device of a plurality of storage devices coupled with a target host computing node, the access request included in a fabric packet routed from a requesting computing node through a networking fabric coupled with the target host computing node;
predicting a memory bandwidth demand for the at least one storage device for one or more subsequent access requests to be received from the requesting computing node; and
causing an adjustment to power supplied to the at least one storage device based, at least in part, on the predicted memory bandwidth demand for the at least one storage device.

13. The method of claim 12, causing the adjustment to power supplied to the at least one storage device based, at least in part, on the predicted memory bandwidth demand further comprises:
causing the adjustment to the power based on expected power usage determined according to power performance information for the at least one storage device that indicates expected power usage for separate memory bandwidth demands from among a plurality of memory bandwidth demands.

14. The method of claim 13, comprising:
obtaining the power performance information for the at least one storage device following a start up of the at least one storage device.

15. The method of claim 12, predicting the memory bandwidth demand comprises using a prediction algorithm having inputs that include past memory bandwidth demands for one or more previous access requests that caused data to be written to or read from the at least one storage device and include past power usage of the at least one storage device while data was written to or read from the at least one storage device responsive to the previous access requests.

16. The method of claim 12, comprising:
receiving a memory bandwidth demand hint from the requesting computing node, the memory bandwidth demand hint included in a second fabric packet from the requesting computing node routed through the networking fabric coupled with the target host computing node, the memory bandwidth demand hint indicating an expected memory bandwidth demand during a unit of time relative to a given point of time;
predicting a second memory bandwidth demand for the at least one storage device for the one or more subsequent access requests to be received from the requesting computing node; and
causing a second adjustment to power supplied to the at least one storage device based, at least in part, on the predicted second memory bandwidth demand.

17. The method of claim 12, causing the adjustment to power supplied to the at least one storage device based, at least in part, on the predicted memory bandwidth demand for the at least one storage device further comprising:
  causing an adjustment to power supplied to one or more storage devices other than the at least one storage device to load balance power usage between the plurality of storage devices.

18. The method of claim 12, comprising:
  processing the access request to cause data to be read from or written to the at least one storage device;
  gathering telemetry information from the plurality of storage devices while data is read from or written to the at least one storage device; and
  using at least a portion of the gathered telemetry information to predict the memory bandwidth demand for the at least one storage device for one or more subsequent access requests to be received from the requesting computing node.

19. The method of claim 12, comprising:
  the plurality of storage devices arranged to operate according to one or more Non-Volatile Memory Express (NVMe) Base Specifications including the NVMe Base Specification, revision 1.3;
  the controller arranged to operate according to the one or more NVMe Base Specifications including the NVMe Base Specification, revision 1.3 and according to one or more NVM Express over Fabrics (NVMeoF) Specifications including the NVMeoF Specification, revision 1.0;
  the access request included in the fabric packet is arranged according to the one or more NVMeoF Specifications including the NVMeoF Specification, revision 1.0; and
  the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

20. At least one non-transitory machine readable medium comprising a plurality of instructions that in response to being executed by a controller cause the controller to:
  receive an access request to read data from or write data to at least one storage device of a plurality of storage devices coupled with a target host computing node that hosts the controller, the access request included in a fabric packet routed from a requesting computing node through a networking fabric coupled with the target host computing node;
  predict a memory bandwidth demand for the at least one storage device for one or more subsequent access requests to be received from the requesting computing node; and
  cause an adjustment to power supplied to the at least one storage device based, at least in part, on the predicted memory bandwidth demand for the at least one storage device.

21. The at least one non-transitory machine readable medium of claim 20, further comprising the instructions to cause the controller to:
  cause the adjustment to the power based on expected power usage determined according to power performance information for the at least one storage device that indicates expected power usage for separate memory bandwidth demands from among a plurality of memory bandwidth demands.

22. The at least one non-transitory machine readable medium of claim 20, the instructions to cause the controller to predict the memory bandwidth demand comprises the instructions to cause the controller to use a prediction algorithm, the instructions to also cause the controller to include past memory bandwidth demands for one or more previous access requests that caused data to be written to or read from the at least one storage device as a first input to the prediction algorithm and include past power usage of the at least one storage device while data was written to or read from the at least one storage device responsive to the previous access requests as a second input to the prediction algorithm.

23. The at least one non-transitory machine readable medium of claim 20, comprising the instructions to further cause the controller to:
  receive a memory bandwidth demand hint from the requesting computing node, the memory bandwidth demand hint included in a second fabric packet from the requesting computing node routed through the networking fabric coupled with the target host computing node, the memory bandwidth demand hint to indicate an expected memory bandwidth demand during a unit of time relative to a given point of time;
  predict a second memory bandwidth demand for the at least one storage device for the one or more subsequent access requests to be received from the requesting computing node; and
  cause a second adjustment to power supplied to the at least one storage device based, at least in part, on the predicted second memory bandwidth demand.

24. The at least one non-transitory machine readable medium of claim 23, the instructions to cause the controller to cause the adjustment to power supplied to the at least one storage device based, at least in part, on the predicted memory bandwidth demand for the at least one storage device further comprises the instructions to cause the controller to:
  cause an adjustment to power supplied to one or more storage devices other than the at least one storage device to load balance power usage between the plurality of storage devices.

25. The at least one non-transitory machine readable medium of claim 20, comprising:
  the plurality of storage devices arranged to operate according to one or more Non-Volatile Memory Express (NVMe) Base Specifications including the NVMe Base Specification, revision 1.3;
  arranged to operate according to the one or more NVMe Base Specifications including the NVMe Base Specification, revision 1.3 and according to one or more NVM Express over Fabrics (NVMeoF) Specifications including the NVMeoF Specification, revision 1.0;
  the access request included in the fabric packet is arranged according to the one or more NVMeoF Specifications including the NVMeoF Specification, revision 1.0; and
  the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

* * * * *